3,301,147
VEHICLE-SUPPORTING MATTING AND PLANK THEREFOR
William A. Clayton and George B. Kortz, Torrance, Calif., assignors to Harvey Aluminum (Incorporated), Los Angeles, Calif., a corporation of California
Filed July 22, 1963, Ser. No. 296,555
4 Claims. (Cl. 94—13)

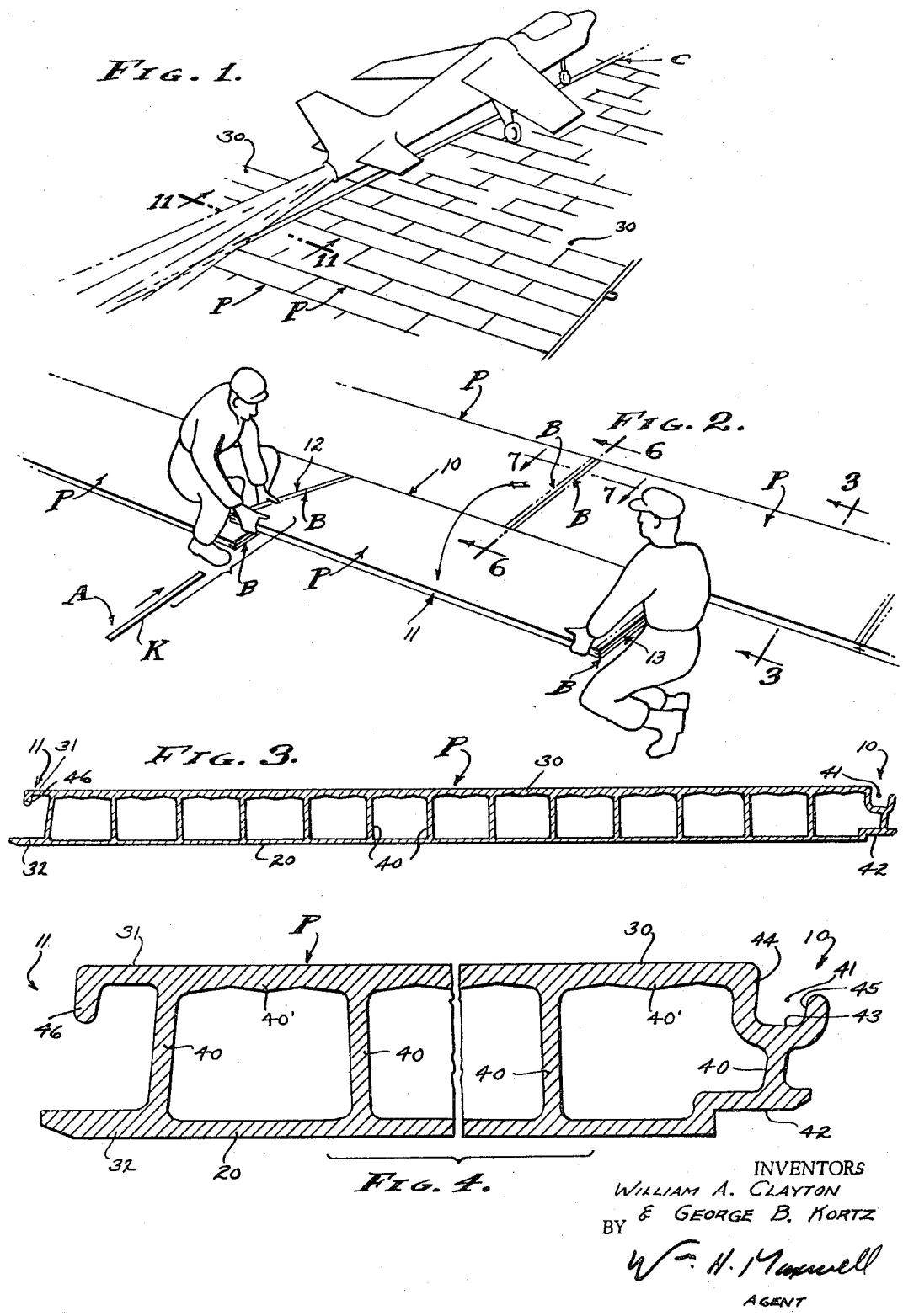

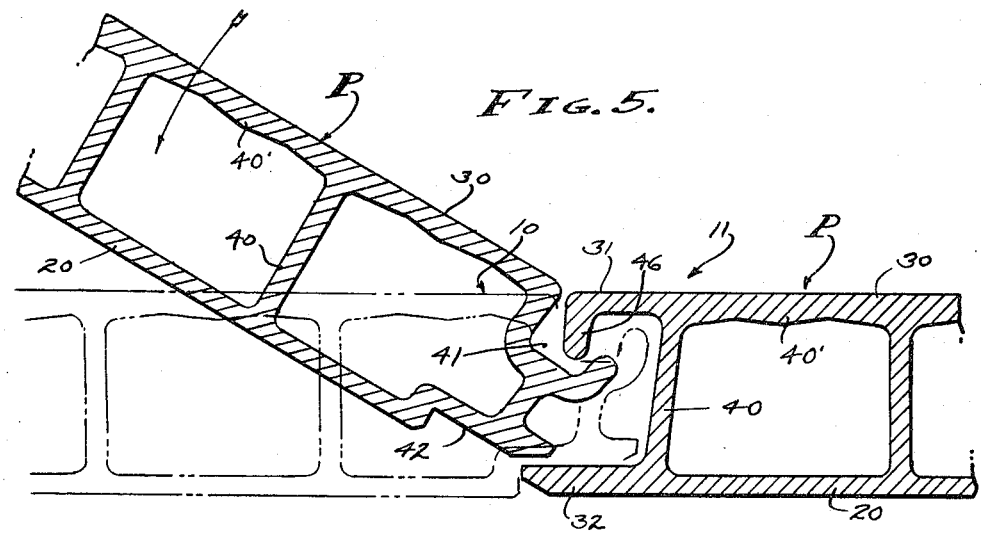
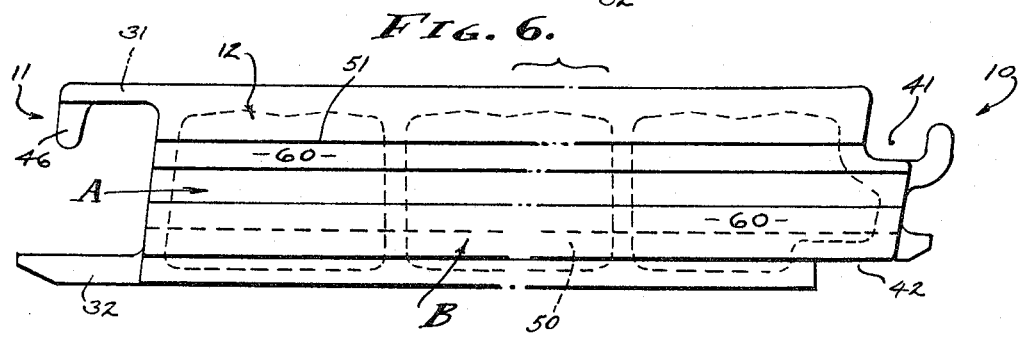
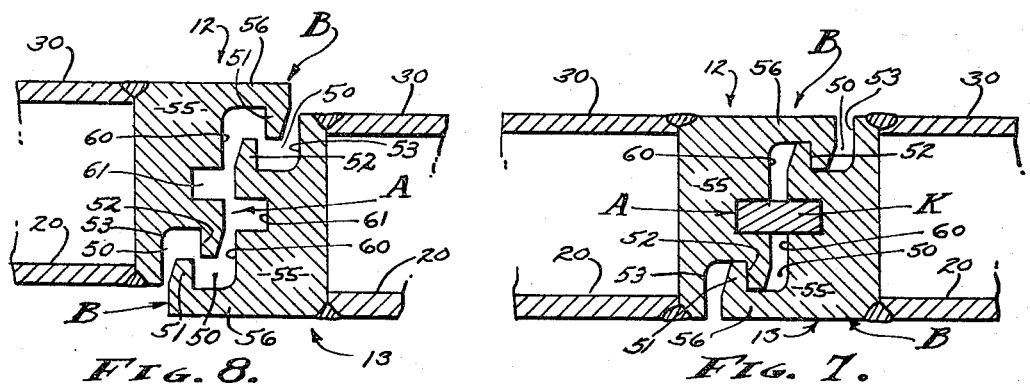

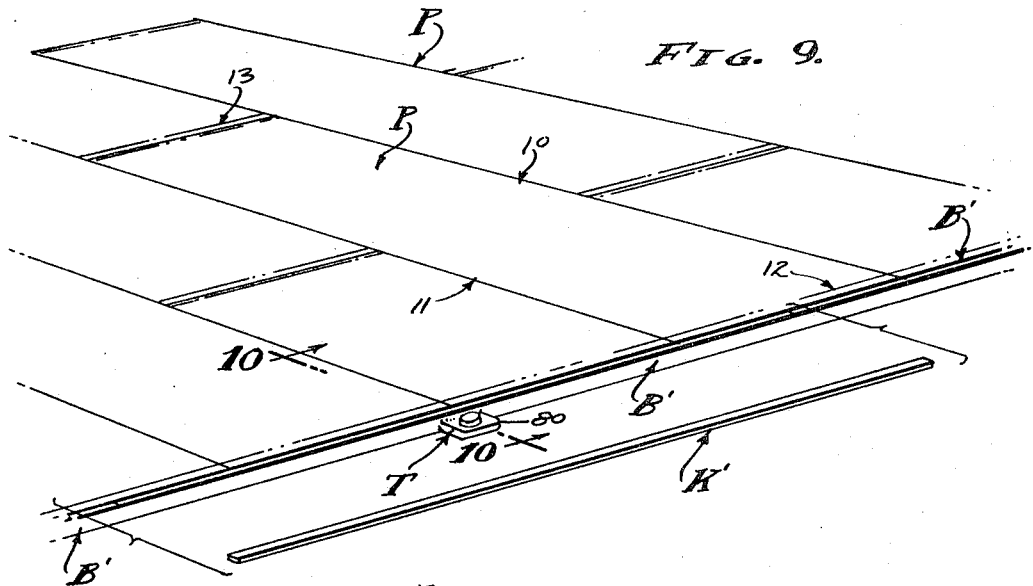
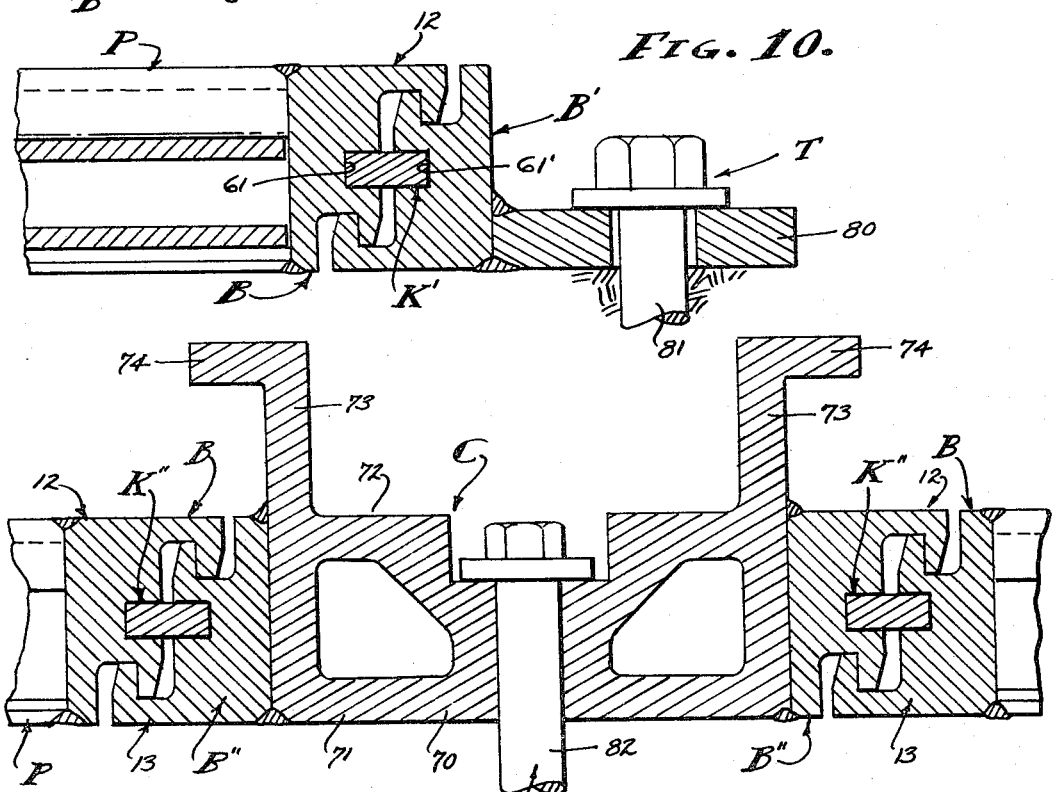

This invention relates to landing installations for aircraft and which involves the construction of a hard durable surface, and like installations. More particularly, this invention relates to a matting that is composed of modular panels of improved configuration and which combine features of structure capable of withstanding environmental and use requirements at a practical cost.

Launching and landing fields for tactical aircraft must be installed or removed with a minimum of effort and they must be more than a fair-weather installation. With the advent of jet propelled aircraft the severity of conditions has been increased far and above the severity experienced with propeller driven aircraft. The heavier weight and consequent faster sink speeds, hot jet blasts impinging upon the mat surfaces, and tendency of the jet compressors to pull stones and debris into the engines are all factors that did not exist with propeller driven planes. Therefore, the fabricated aluminum corrugated and perforated matting that has been used satisfactorily with propeller driven aircraft is no longer suitable with jet propelled aircraft.

In order to devise a mat satisfactory for operation with present day tactical aircraft of the jet propelled type the mat must be capable of withstanding much higher vehicle landing impacts that result from both mechanical arrestment gear as well as from the higher sink speeds. Such a mat, for present day military aircraft, must be capable of withstanding landing impact loads from a main landing wheel of 135,000 lbs. distributed as follows: 63,500 lbs. over an imprint area of 136 square in. (flattened tire— 480 p.s.i.) and the remainder over two areas of 6.25 square in. each where the rim loads the matting through the tire (rims are normally 7 in. apart). Such a matting must be capable of withstanding a 14,000 lb. arresting hook impact load; it must be capable of module type construction for assembly into an area of any size or shape; it must be capable of being disassembled and reinstalled at another location with a minimum of effort and with a minimum of repair; it must be capable of being used in conjunction with various forms of catapults and arresting gear; it must be capable of being handled and transported with facility and laid at a high rate; it must be capable of module replacement; it must be capable of withstanding fire, explosions and severe temperature and pressure changes; and it must be devoid of openings and/or protuberances and such that it will conform to the contours of the supporting terrain, whether concaved or convexed.

Heretofore, matting of the type under consideration has been fabricated of a multiplicity of parts per module, and characteristically by corrugated elements with perforations, weldments, and fasteners. As a result, the surface of said matting is usually interrupted with voids, openings and protuberances. Further, all abutted joints have not been aligned in the prior art matting, with the result that the planar surfaces of adjoining modules often occur at two levels and with detrimental effect upon the tires of the aircraft. This surface misalignment has, therefore, been the cause of cutting of rubber from the aircraft tires and it has also been the cause of mat destruction when severe landings have been encountered.

An object of this invention is to provide a modular matting for the purposes under consideration and which involves the fewest number of parts, and wherein all of the parts align into a single coplanar matting when the modules are assembled in adjacent and abutted relationship with each other.

An object of this invention is to provide a module for interconnection with other like or identical modules and which is essentially a single part, and whereby a multiplicity of modules can be adjacently and abuttedly arranged, with all four edges thereof in co-planar alignment with the other modules involved.

Another object of this invention is to provide modules of the character referred to and which are locked together at opposite parallel edges. At all edges the modules hook together in coplanar relationship, and at one pair of opposite edges (end edges) the modules are keyed together in exact co-planar relationship. Thus, the modules continue in one plane.

Another object of this invention is to provide means along the marginal edges of modular members of the character referred to for locking said members in coplanar relationship. Further, said means for locking is also applicable to the coupling of said members to other members and varied equipment.

It is still another object of this invention to provide a matting of the character referred to that is of minimum weight without sacrificing strength and durability. The modules are formed of light weight metal, aluminum alloy, and the element comprising the module structure is integrally and simultaneously formed for all practical purposes, preferably by extrusion methods.

It is also an object of this invention to provide a modular matting, all as above referred to, and which is relatively inexpensive to manufacture and which is extremely easy to transport and handle.

The various objects and features of this invention will be fully understood from the following detailed description of the typical preferred form and application thereof, throughout which description reference is made to the accompanying drawings, in which:

FIG. 1 is a perspective view of a typical landing mat installation showing an aircraft in the process of being catapulted therefrom, for example.

FIG. 2 is also a perspective view and shows the manipulation involved in the installation of FIG. 1.

FIG. 3 is an enlarged sectional view taken as indicated by line 3—3 on FIG. 2, and FIG. 4 is an enlarged detailed section of the member as shown in FIG. 3.

FIG. 5 is an enlarged detailed view showing two members as shown in FIG. 2 and the manner in which they are joined, full lines indicating positioning before movement as indicated by the arrow, and phantom lines indicating positioning after complete joinder.

FIG. 6 is an end view of one of the said members and taken as indicated by line 6—6 on FIG. 2.

FIG. 7 is an enlarged sectional view taken as indicated by the line 7—7 on FIG. 2, and FIG. 8 is a similar view showing the positioning of the parts for assembly.

FIG. 9 is a perspective view of the marginal portion of the landing mat installation on the installation starting side with the "key" part exploded therefrom in order to indicate its length in proportion to the "lock bars" at the ends of the mat modules.

FIG. 10 is an enlarged detailed sectional view taken as indicated by line 10—10 on FIG. 9 and showing the installation and assembly of the said lock bars at the side of the landing mat or at the ends of the mat modules.

FIG. 11 is a sectional view taken at the center of the landing installation as shown by line 11—11 on FIG. 1 and showing the joinder to equipment such as for example a catapult.

The aircraft landing mat is made up of like modules in the form of planks P which can be conveniently packaged and transported and easily handled by personnel.

Dimensionally, a normal plank P is 12 ft. in length and nominally 2 ft. in width, and 1½ in. in thickness. Also, there is a half-plank 6 ft. in length, it being understood that said dimensions are selected as best suited to the matting hereinafter disclosed. Thus, for example, six full planks can be laid end to end in order to make up a landing width of 72 ft., and the abutted end joints staggered in the next adjacent roll of planks by using a pair of half-planks, all as clearly shown in FIG. 1 of the drawings. It will be apparent that the length of the landing will be a multiple of two ft. normally 1200 ft. or more.

As is shown, the planks P are flat and straight elongate elements having parallel side edges 10 and 11 and parallel ends 12 and 13. The said edges and ends differ from each other in their relationship to the plank P, and in observing any given plank in plan view the said edges and ends occur in consecutive counter-clockwise order as follows: 10, 12, 11 and 13. The edge 10 is of channel configuration and is disposed upwardly; the end 12 is of a mating configuration and is disposed downwardly; the edge 11 is of flanged configuration and is disposed downwardly; and the end 13 is of a mating configuration and is disposed upwardly. The plan view orientation of all planks P remains the same, whereby the respective edges and ends adjoin and/or abut in hooked and/or keyed together relationship.

As is clear from the drawings, the plank P is essentially an extruded element formed of a single body of material, preferably 6061 aluminum alloy that is heat treated to the T-6 condition. This extruded body is formed by the usual processes of extrusion, being straightened and heat treated and then cut to modular lengths as above described.

The plank P comprises a lower supporting plate 20 and a flat topped upper deck plate 30 joined by webs 40 disposed at right angles to the two plates. The webs 40 are disposed parallel with each other at 1¾ in. intervals so as to extend coextensively with the extrusion. As shown, there are fourteen webs 40 that are vertically disposed in spaced parallel planes normal to the spaced plates P 20 and 30. Thus, the cross-section of the plank is composed of a plurality of like box sections, adjacent box sections having a web 40 in common. The lower support plate 20 and webs 40 are of a uniform and minimum thickness of .140 in. with filleted corners of joinder. In accordance with the invention, the deck plate 30 must remain flat topped and is strengthened intermediate the webs 40 in order to ensure flatness and is therefore provided with a deepened cross-section where increased bending stresses occur. The span of the deck plate 30 varies in thickness as it extends between the supporting webs 40, being of substantial thickness where it has filleted joinder with the spaced webs 40, say for example .172 in. in thickness, and tapered to a nominal thickness at a point spaced laterally of the webs, say for example to a .140 in. in thickness and forming spaced side portions of truss form. There is a mid truss portion 40' that is strengthened independently of the said side portions and which is supported by the two laterally disposed side portions. The said mid truss portion 40' is a centrally located portion which extends between the two side portions and is tapered inwardly toward a deepened center from said .140 in. thickness to a depth or thickness of .172 in. Thus, the side portions join the mid truss portion at the points of minimum thickness. In practice, the span between webs 40 is symmetrical having overlapping trussed side portions and centrally deepened mid truss portion 40'. The top of the deck plate 30 remains flat while the underside is deepened as described, all to the end that bending stress is evenly distributed throughout the span of the flat topped deck plate 30.

The edge 10 hereinabove referred to comprises a modified web 40 at one margin of the plank P (see FIG. 4) and wherein said marginal web has an upwardly opening channel 41 at the deck plate 30 and a downwardly faced shoulder 42 recessed upwardly from the support plate 20. The channel 41 has a bottom 43 in a plane spaced below the deck plate 30, it has an inner wall 44 joined to the said deck plate at a rounded corner, and it has an outer wall 45 parallel to the first mentioned wall and terminating in a plane below the plate 30. The shoulder 42 is a flat recess that is formed by an inwardly offset marginal section of plate 20 and it joins integrally with the web 40. It will be apparent that edge 10 presents a male element configuration in cross section.

The edge 11 hereinabove referred to comprises a modification at the other margin of the plank P (see FIG. 4) and wherein the plates 30 and 20 are extended at 31 and 32 to form parts to mate with the edge 10 above described. As shown, the deck plate extension at 31 has a turned down flange 46, with rounded corners, that is adapted to depend into the channel 41 for hooked engagement of adjacent planks P. The margins of the two plates 20 and 30 extend laterally of the edge web 40 so as to form a female element to receive the male element of edge 10 so as to have locked engagement of the flanged edge 11 in the channel 41 and engagement of the extension at 32 in the recess and against the shoulder 42 of the channeled edge 10. In other words outer wall 45 of edge 10 and downturned flange 46 of edge 11 interlocks to prevent separation of the planks by coplanar movement. It will be apparent that adjacent planks P to be coupled are angularly related, as shown in FIG. 5, whereby the flange of one plank is entered into the channel of the other plank and then the planks manipulated to a coplanar condition (shown by phantom lines) with the extended lower plate of said one plank locked under the shoulder 42 of the said other plank. The parts are made to fit loosely and to permit the movement specified.

In accordance with the invention butt bars B are provided at opposite ends of the planks P to close the box sections, or cells, of the planks and to hook abutting ends of the planks P together. The butt bars B are alike regardless of installation at the ends 12 or 13, but one is disposed downwardly while the other is disposed upwardly. That is, the hook disposition is downward and upward at the two bars B respectively. Since horizontal compression and tension forces are transmitted by the two plates 20 and 30 there is a hook engagement at the end edge of each plate. At end 12 there is a channel 50 near the end of the plate 20 and a flange 51 is spaced from the end of the plate 30. At end 13 there is the channel 50 near the end of the plate 30 and a flange 51 is spaced from the end of the plate 20. The channel 50 and flange 51 are displaced laterally of each other with a flat wall 60 extending between and in a plane normal to the two plates 20 and 30.

The bars B are characterized by their uniform cross-section, with the channel 50 opening outwardly of the bar at one plate of the plank and with the flange 51 extending inwardly of the bar at the other plate of the plank. The bar B comprises a body 55 that is coextensive with the end configuration of the plank P and said body 55 is welded to the plank as indicated, at both end plates 20 and 30. The channel 50 is formed in the body 55 with an outer wall 52 spaced from and parallel with an inner wall 53. The said outer wall 52 terminates at a plane spaced inward from the plane of the plate (20 or 30). The flange 51 is formed at the opposite corner of the body 55 and projects inward from the opposite plate extension 56. The wall 60 extends between the said extension 56 and the edge of the channel wall 52. It will be apparent that on end 12, reference numeral 52 designates a downwardly directed male element when considered in cross section and channel 50 is a downwardly directed female element when considered in cross section. Similarly, on end 13 upwardly projecting flange 51 is an upwardly directed male element and channel 50 is an upwardly directed female element. When these elements of end 12 are engaged with the same elements of end 13, separation of the planks by coplanar longitudinal movement is prevented.

With the plank as thus far described the bars B of the abutting planks P are overlapped in hooked engagement, so that they are coupled to transmit compression and mainly tension stresses in the planes of the two plates 20 and 30. In accordance with the invention it is important to maintain coplanar engagement of the abutted ends of the planks P, and for this function alignment means A is provided at the point of end joinder between abutted planks P. With adjacent edges of the planks P engaged and hooked together as above described, the abutted ends of the planks P are locked in coplanar alignment. The abutting plank ends 12 and 13 are brought into apposition whereby opposed walls 60 come close together or into actual face to face engagement. In carrying out the invention the body 55 of each bar B has a central laterally opening keyway 61 adapted to receive a horizontally disposed key K. The keyways 61 are in opposed positions so as to form a single opening that extends across the ends of the planks P only when the planks are coplanar. Therefore, insertion of the key K transversely into the opening formed by the composition of the two keyways 61 spreads the opposed walls 60 until the opposite flanges 51 engage with opposite walls 52. With the flanges 51 hooked in the channels 50 the occupancy of the key K in the keyways 61 prevents vertical movement of one plank relative to the other. In practice, the keyways 61 and key K are of rectangular cross-section, with suitable clearances, with said key K extending from edge 10 to edge 11 so as to align the entire width of the planks.

In FIG. 9 of the drawings the marginal portion of the installation in FIG. 1 is shown enlarged and the key K' is shown separately as it would appear if removed from the assembly. In this figure of the drawings the lock bars B' are shown and which are the same or identical in cross-section when compared with the bars B hereinabove described. It will be apparent that these bars B and B' can be formed as by extrusion and that they can be easily straightened and cut off to any desired length. In the case of the bars B the end cuts are contoured as illustrated in FIG. 6, whereby surface continuity of the assembled mat is maintained. Note the left end of bar B in FIG. 6 which is notched and which extends to the flange 46. In the case of the edge hold down members or lock bars B', one of which is shown in full the ends are cut normal (or they can be notched if so desired), and each lock bar B' is of a length equal to or greater than one plank width. For example, the lock bar B' is preferably three plank widths in length and in practice the ends of the lock bars B' are abutted intermediate the edges 10 and 11 of the planks P. In FIG. 10 the lock bar B' is disposed upwardly so as to hookedly engage with the downwardly disposed bar B at plank 12, it being understood that the lock bar installation at the opposite marginal portion of the landing (not shown) is just the opposite so as to engage with the upwardly disposed end 13. In any case, the key K' is installed the same as key K by sliding the same into the opposed keyways 61 and 61' whereby there is flange and channel engagement holding the two bars together and with the key K' in the said keyways so as to prevent vertical movement of the bars relative to each other.

In FIG. 11 of the drawings the central portion of the landing installation is interrupted by a longitudinal installation such as for example a catapult C. In this case, the said catapult C has a body 70 with flat bottom and top faces 71 and 72 in the planes of the plates 20 and 30 and such as to form continuations of said plates. A pair of laterally spaced tracks 73 project upwardly from the top face 72 and have flat horizontal flanges 74 that form rails disposed in a common supporting plane.

The opposite sides of the catapult body 70 are provided with lock bars B" integrally formed therewith or welded thereto as shown. Although it may not be necessary to cut the catapult body to the same length as the lock bars B", it is advantageous to cut the said bars B" to modular lengths the same as the bars B' as above described. By so cutting the bars to lengths equal to one or more widths of the plank P there is continuity of the bars B' and B" through or by one or more points of joinder between adjacent planks P. In practice, the bars B' and B" can be cut to three plank widths, in which case they extend through three points of joinder and thereby prevent articulation between adjacent planks P. As shown, the keys K' and K" are the same lengths as the bars B' and B" which they are to engage in.

In both FIGS. 10 and 11 tie-down means T is shown whereby securement is made into the supporting terrain. In the case of the bars B' there are ears 80 projecting laterally of the body 55 and a suitable fastener 81, or lag, projects into the terrain for securement with an anchor. In the case of the bars B" the fasteners 82 project through the body 70 of the catapult C into the terrain.

From the foregoing it will be seen that the modular planks P are of simple construction, made of a single extruded element closed by a pair of simple and rugged butt bars. The butt bars employed in combination with the planks P hereinabove described are alike and serve not only to close the ends of the planks P but serve two additional functions, firstly to positively hook abutted planks and lock bars together and secondly to cooperatively receive a key element so that coplanar alignment of abutted planks and lock bars is assured under all circumstances. It will be clear that the adjacency of planks P captures the keys K in working position between abutted planks with no danger of displacement, it being understood that suitable keepers for the keys K can be supplied at the outside margins of the landing installation. Also, it will be clear that the lock bars B' and B" straighten the central and marginal portions of the landing mat so that the installation remains flat at these two portions. By having said lock bars B' at the marginal portions of the landing mat installation the danger of buckling, or of any module lifting, is virtually eliminated. Furthermore, with the mat installation hereinabove disclosed there are no through openings in the matting and with the margins reinforced as they are by lengthy lock bars, forces such as explosive forces cannot penetrate beneath or under the edges of the matting to lift and/or damage the same.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:
1. A section of matting comprising:
  (a) a plurality of planks, each plank having a unitary elongated body portion with a flat upper surface,
  (b) continuous male connecting means formed integral with the body portion of each plank along one longitudinal side of the body portion,
  (c) continuous complementary female connecting means formed integral with the body portion of each plank along the other longitudinal side of the body portion and presenting an opening along the length thereof receiving portions of the male connecting means of contiguous planks,
  (d) an upwardly projecting element on the male connecting means spaced outwardly from the body portion of each plank,
  (e) a downwardly projecting element associated with each female connecting means positioned to define one side of the opening in the female connecting means, the height dimension of the opening being greater than the height dimension of the male connecting means of each plank, the upwardly projecting element on the male connecting means and the downwardly connecting element on the female connecting means being dimensioned so that the male connecting means can be inserted and withdrawn from the female connecting means only with the upper surfaces of the body portions of the two planks arranged at an angle of less than 180° to each other,
(f) end connecting means arranged transversely of the body portion of each plank at each end of the body portion and connected thereto,
(g) an upwardly facing channel including an upwardly projecting element in one end connecting means of each plank,
(h) a complementarily shaped downwardly facing channel including a downwardly projecting element in the other end connecting means of each plank,
(i) a slot in each end connecting means extending the length thereof and opening in a direction away from the body portion, the slot at each end of each plank being similarly arranged so that the slots in two end to end contiguous planks register to form a keyway with the downwardly projecting element of the first plank received in the upwardly facing channel of the second plank and the upwardly projecting element of the second plank received in the downwardly facing channel of the first plank,
(j) the contiguous planks of the matting being arranged with the flat upper surfaces of adjacent planks coplanar and the male and female connecting means in the interlocking relationship described in limitation (e) and with the end to end connections of limitation (i) between contiguous planks being staggered relative to said end to end connections between contiguous planks along the longitudinal edge connections, and
(k) keys inserted in keying relation to the keyways of limitation (i) and blocked against endwise withdrawal by the connecting means of the longitudinal sides of the two contiguous planks.

2. A section of matting comprising:
(a) a plurality of planks,
(b) each plank being made up of an elongated body portion,
(c) side connecting means on each longitudinal side of each plank interconnected with side connecting means of contiguous planks except at an edge of the matting to hold the planks in side-by-side relation against separation from one another,
(d) end connecting means including a keyway on each end of each plank with the keyways of contiguous planks being interconnected to hold the contiguous planks in end-to-end relation against separation from one another,
(e) the ends of the planks forming said edge of the matting falling in a straight line,
(f) an edge hold down member extending along the edge of the matting adjacent a plurality of the ends of contiguous planks,
(g) a keyway in the edge hold down member registering with the keyways in the end connecting means of a plurality of contiguous planks along said edge,
(h) a unitary rigid key inserted in keying relation to the registering keyways of the edge hold down member and plank end connecting means along said edge and extending across a plurality of the contiguous plank end connecting means, and
(i) a ground anchoring member connected to the edge hold down member and penetrating into the ground for holding the edge hold down member against substantial movement relative to the ground.

3. An elongated, hollow, integral and unitary metallic extrusion of uniform cross sectional shape comprising
(a) an imperforate substantially flat topped deck,
(b) an imperforate bottom plate,
(c) a plurality of imperforate webs extending lengthwise of the body intermediate the side edges of the extrusion and in parallel spaced relationship to each other, joining the lower surface of the deck and the upper surface of the bottom plate, and
(d) complementarily shaped side connecting members closing each longitudinal side of the extrusion and joined to the associated edges of the deck and bottom plate,
(e) the cross section of the deck having a deep portion at each point where the webs and the side connecting members are joined to the deck,
(f) the cross section of the deck having a deep portion at a point between each two adjacent deep portions of limitation (e),
(g) the cross section of the deck between the deep portions of limitations (e) and (f) tapering down gradually in depth to a minimum depth at a point intermediate each two adjacent deep portions of limitations (e) and (f).

4. An elongated, hollow, integral and unitary metallic extrusion of uniform cross sectional shape comprising
(a) an imperforate substantially flat topped deck,
(b) an imperforate bottom plate,
(c) a plurality of imperforate webs extending lengthwise of the body intermediate the side edges of the extrusion and in parallel spaced relationship to each other, joining the lower surface of the deck and the upper surface of the bottom plate, and
(d) complementarily shaped side connecting members closing each longitudinal side of the extrusion and joined to the associated edges of the deck and bottom plate,
(e) the cross section of the deck having a deep portion at each point where the webs and the side connecting members are joined to the deck,
(f) the cross section of the deck having a deep portion at a point between each two adjacent deep portions of limitation (e),
(g) the cross section of the deck between the deep portions of limitations (e) and (f) tapering down gradually in depth to a minimum depth at a point intermediate each two adjacent deep portions of limitations (e) and (f),
(h) the cross sectional dimension of the deck at each deep portion being about one and a quarter times as deep as the cross sectional dimension of the deck at the points of minimum depth and about ten times the distance between adjacent webs.

References Cited by the Examiner

UNITED STATES PATENTS

| 1,913,342 | 1/1933 | Schaffert | 189—34 |
| 2,878,904 | 3/1959 | Fanner | 189—34 |
| 2,956,652 | 10/1960 | Liskey | 189—34 |
| 2,957,555 | 10/1960 | Edgar | 189—34 |
| 3,023,834 | 3/1962 | Buchanan | 189—34 |
| 3,100,556 | 8/1963 | De Ridder | 189—34 |
| 3,170,201 | 2/1965 | Nofziger | 20—99 |
| 3,172,508 | 3/1965 | Doering | 52—579 |

FOREIGN PATENTS

| 87,282 | 8/1959 | Denmark. |
| 799,166 | 8/1958 | Great Britain. |

JACOB L. NACKENOFF, *Primary Examiner.*

CHARLES E. O'CONNELL, *Examiner.*